United States Patent
Huyghe, Jr.

(10) Patent No.: US 9,987,882 B2
(45) Date of Patent: Jun. 5, 2018

(54) TIRE WITH A RADIAL OR CROSS-PLY CARCASS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Jean-Michel Huyghe, Jr., Clermont-Ferrand (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 774 days.

(21) Appl. No.: 14/390,946

(22) PCT Filed: Apr. 4, 2013

(86) PCT No.: PCT/EP2013/057072
§ 371 (c)(1),
(2) Date: Oct. 6, 2014

(87) PCT Pub. No.: WO2013/150088
PCT Pub. Date: Oct. 10, 2013

(65) Prior Publication Data
US 2015/0114534 A1    Apr. 30, 2015

(30) Foreign Application Priority Data

Apr. 6, 2012    (FR) ...................................... 12 53192

(51) Int. Cl.
*B60C 9/18* (2006.01)
*B60C 9/22* (2006.01)
(Continued)

(52) U.S. Cl.
CPC .................. *B60C 9/20* (2013.01); *B60C 9/18* (2013.01); *B60C 9/1807* (2013.01); *B60C 19/08* (2013.01);
(Continued)

(58) Field of Classification Search
CPC ......... B60C 9/18; B60C 9/1835; B60C 9/185; B60C 9/20; B60C 9/22; B60C 9/2204; B60C 9/28
See application file for complete search history.

(56) References Cited

U.S. PATENT DOCUMENTS 5,156,921 A * 10/1992 Lin ....................... B60C 1/0016
428/519
5,879,483 A * 3/1999 Gerresheim .............. B60C 9/18
152/209.5

(Continued)

FOREIGN PATENT DOCUMENTS

EP         09049581 A2    3/1999
GB         720150    * 12/1954
(Continued)

OTHER PUBLICATIONS

International Search Report for PCT/EP2013/057072 dated May 24, 2013.
French Search Report for FR 1253192 dated Nov. 27, 2012.

*Primary Examiner* — Justin R Fischer
(74) *Attorney, Agent, or Firm* — Dickinson Wright PLLC

(57) ABSTRACT

Tire having at least one carcass reinforcement, a tread, a belt reinforcer having a first and a second end and:
 a reinforcing ply, having a transverse half-width L2, having a reinforcing polymer layer between two layers of coating rubber,
 at least one hooping ply, surmounting the reinforcing ply, having a transverse half-width L1, and filamentary
(Continued)

reinforcing elements, parallel two by two, forming an angle at most equal to 7° with respect to the circumferential direction, the tire having at least one layer of edge uncoupling rubber, positioned at least radially between the hooping ply and the reinforcing ply and positioned at at least one transverse end of the belt reinforcer, the layer of edge uncoupling rubber having a total length between 10 and 40 mm and a thickness between 0.2 and 1.2 mm, having at least one reinforcing ply, and at at least one end of the belt reinforcer, the half-widths L1 and L2 are different, and manifest a difference (L1−L2) between 5 and 10 mm.

18 Claims, 3 Drawing Sheets

(51) Int. Cl.
*B60C 9/28* (2006.01)
*B60C 9/20* (2006.01)
*B60C 19/08* (2006.01)

(52) U.S. Cl.
CPC ...... *B60C 9/185* (2013.01); *B60C 2009/1842* (2013.01); *B60C 2009/1864* (2013.01); *B60C 2009/2012* (2013.01); *B60C 2009/2035* (2013.01); *B60C 2009/2051* (2013.01)

(56) References Cited

U.S. PATENT DOCUMENTS

| | | | |
|---|---|---|---|
| 6,209,603 B1 | 4/2001 | Kanenari et al. | |
| 6,966,999 B2 * | 11/2005 | Tsou | B60C 1/0008 264/234 |
| 2012/0090755 A1 | 4/2012 | Deal | |

FOREIGN PATENT DOCUMENTS

| | | | |
|---|---|---|---|
| GB | 1340687 | * | 12/1973 |
| GB | 1410035 | * | 10/1975 |
| JP | 62244702 | | 10/1987 |
| WO | 2010115860 A1 | | 10/2010 |

* cited by examiner

TIRE WITH A RADIAL OR CROSS-PLY CARCASS

This application is a 371 national phase entry of PCT/EP2013/057072, filed 4 Apr. 2013, which claims benefit of FR 1253192, filed 6 Apr. 2012, the entire contents of which are incorporated herein by reference for all purposes.

BACKGROUND

1. Field

The disclosure relates to radial or cross-ply tires.

2. Description of Related Art

Radial tires have gradually found their way into various markets, notably the passenger car tire market. This success is due in particular to the qualities that radial tire technology displays in terms of endurance, comfort and low rolling resistance.

The main parts of a tire are the tread, the sidewalls and the beads. The beads are intended to come into contact with the rim. In a radial tire, each of the main parts that make up the tire, namely the tread, the sidewalls and the beads, has functions clearly separated from one another and therefore has a well known specific makeup.

A radial tire is essentially reinforced by a carcass reinforcement comprising at least one carcass ply making, under the tread, an angle substantially equal to 90° with respect to the circumferential direction of the tire. This carcass reinforcement is surmounted radially on the outside, and under the tread, by reinforcing plies that form a belt.

A cross-ply tire differs from a radial tire through the presence of at least two crossed carcass plies making angles other than 90° with respect to the circumferential direction of the tire. The plies are said to be "crossed" because the angles are of opposite signs from one ply to the other.

It will be recalled that the circumferential direction of the tire is the direction comprised in a plane perpendicular to the axis of rotation of the tire and tangential to the belt reinforcer of the tire.

Following the appearance of radial tires, certain cross-ply tires have also been provided with a belt reinforcer under the tread.

In both these types of tire, the tread, which is in direct contact with the ground, has the notable function of providing contact with the roadway and has to adapt to suit the shape of the ground. The sidewalls, for their part, absorb unevenesses of the ground while transmitting the mechanical forces needed for bearing the load of the vehicle and allowing it to move along.

The belt reinforcer is a reinforcement which needs, on the one hand, to be sufficiently rigid with respect to deformations on the edge so that the tire can develop the cornering forces necessary for steering it, and transmit the driving or braking torque and, on the other hand, to be very flexible in bending, i.e. allow variations of curvature of its plane in order to ensure a sufficient surface area for contact between the tire and the ground.

As a result, the belt reinforcer generally has a composite structure allowing it to offer the required stiffness for a relatively low weight. The belt reinforcer is generally made up of at least two plies at different angles, containing reinforcers, in the form of cables, coated in rubber. The reinforcing elements are crossed from one ply to the other with respect to the circumferential direction and may or may not be symmetric about this direction.

Definition of terms hereinafter:

"longitudinal direction": direction of running of the tire,

"radially on the inside of": means on a straight line perpendicular to the axis of rotation of the tire, closer to the axis of rotation, "radially on the outside of": means on a straight line perpendicular to the axis of rotation of the tire, further from the axis of rotation, "equatorial plane or median plane": plane perpendicular to the axis of rotation of the tire and which divides the tire into two substantially equal halves, "transverse direction of the tire": direction parallel to the axis of rotation, "radial plane": a plane which contains the axis of rotation of the tire, "meridian section": cross section containing the axis of rotation.

Application WO 2010/115860 A1 already discloses a tire for a passenger car, comprising the following three distinct elements:

a radial carcass reinforcement formed of reinforcers extending from one bead of the tire to the other, a crown belt which essentially consists of:

reinforcers parallel to the circumferential direction of the tire intended to provide hooping, and a stiffening layer which essentially consists of reinforcers of the thermoplastic polymer type, in the form of strips coated with rubber, the strips forming an angle comprised between 10° and 80° with the circumferential direction of the tire.

The strips are defined as having, when viewed in cross section, a width at least equal to five times their maximum thickness.

This tire has the notable benefit of being more lightweight than the tires of the prior art, while at the same time maintaining very good cornering stiffness.

It will be recalled that the cornering stiffness of a tire has a decisive influence over the transverse stability of the vehicle. The higher the cornering stiffness, the greater the cornering force at a given cornering angle. Remember that the cornering angle is defined as the angle of the plane of the wheel with respect to the path followed by the tire.

Thus, the nature and location of the belt reinforcing components are decisive parameters in the cornering stiffness and therefore have a decisive influence over the cornering force of the tire. Now, that earlier patent application WO 2010/115860 A1 proposes a novel design regarding the nature and layout of the belt reinforcing components, that allows the tire to be lightened while at the same time maintaining good cornering force results.

SUMMARY

It is one objective of embodiments of the invention to be able to guarantee cornering stiffness results similar to those obtained with a belt reinforcer design such as that disclosed in application WO 2010/115860 A1, while at the same time further improving the overall performance compromise of such a tire.

Specifically, developing this type of design, according to that prior document, has necessitated gaining control over numerous physico-chemical parameters that interact with one another. Now, given the nature and radially different layout of the stiffening layer, a person skilled in the art cannot transpose the design rules for more usual designs using reinforcing cables.

Furthermore, given the radically different nature and overall geometry of the stiffening layer, all the relative positionings of all the elements of the crown reinforcement need to be redefined.

The inventors have noticed that very different shear loadings principally arise at the edges of the plies notably as a result of the use of circumferential reinforcers in the edges collaborating with just one stiffening layer.

This is because the rubbers and the cables have to be able to withstand considerable forces locally.

Document EP 0 756 948 A2 discloses a tire comprising a crown zone; the said crown zone comprising a hooping ply and a reinforcing ply which are separated by at least one layer of bonding rubber positioned between at least two radially successive plies, and at each axial end of the crown zone. However, this document provides no specifics regarding the widths of each ply.

Document DE 2005 049184 A1 also describes a tire comprising a crown zone which notably comprises a reinforcing ply and a hooping ply which are separated by at least one cushioning rubber inserted at each axial end of the crown zone, and between at least two radially successive plies. The hooping ply may be positioned variably with respect to the radial axis. This document provides no indication as to the widths of the plies.

The subject of embodiments of the invention is therefore a tire comprising at least one carcass reinforcement radially inside a belt reinforcer comprising a first and a second end, the said belt reinforcer being radially inside a tread, comprising the following distinct elements:

- a reinforcing ply, having an axial half-width L2, comprising a polymer reinforcing layer positioned between two layers of coating rubber, the said polymer layer being in the form of strips,
- at least one hooping ply, having an axial half-width L1, and comprising filamentary reinforcing elements, parallel two by two, forming at most an angle equal to 7° with respect to the circumferential direction of the tire, the said at least one hooping ply surmounting the reinforcing ply.

This tire comprises at least one layer of edge uncoupling rubber, positioned at least radially between the hooping ply and the reinforcing ply and positioned at at least one transverse end of the belt reinforcer, the said layer of edge uncoupling rubber having a total length comprised between 10 and 40 mm and a thickness comprised between 0.2 and 1.2 mm. This tire is characterized in that it comprises at least one reinforcing ply, and in that at at least one end of the belt reinforcer, the half-widths L1 and L2 are different, and manifest a difference (L1−L2) comprised between 5 and 10 mm.

The reinforcing ply makes an angle comprised between +/−20° and +/−50° with respect to the circumferential direction of the tire. When the tire comprises at least two reinforcing plies, these may each be positioned at an angle comprised between +/−20° and +/−50°, except for 0°, with respect to the circumferential direction, and with respect to one another, with all possible combinations of angles.

The thickness of this edge uncoupling rubber may be uniform or non-uniform across its entire width.

The tire according to an embodiment of the invention has the advantage of maintaining homogeneous local operation of each element of which the belt reinforcer is made, relative to one another, particularly at the edges of the ply, by controlling or even reducing shear movements.

For preference, the edge uncoupling rubber has a secant modulus at 10% elongation comprised between 3 and 70 MPa, the said layer of rubber preferably being positioned at each of the transverse ends of the belt reinforcer.

The layer of edge uncoupling rubber is preferably positioned at each of the transverse ends of the belt reinforcer, between the reinforcing ply and the hooping ply or, alternatively, both underneath and on top of the reinforcing ply so as to form a turn-up around the reinforcing ply, or alternatively still, both between the reinforcing ply and the hooping ply, at at least one transverse end of the belt reinforcer, and underneath and on top of the reinforcing ply at another end of the belt reinforcer.

In a preferred embodiment, each layer of coating rubber of the reinforcing layer may comprise a diene rubber. Each layer of coating rubber of the reinforcing layer is preferably made of polymer and more preferably made of thermoplastic polymer. Each layer of coating rubber of the reinforcing layer may comprise at least one liquid plasticizer, possibly combined with at least one tackifying resin.

In an advantageous alternative form of embodiment, each layer of coating rubber of the polymer reinforcing layer may have a secant modulus at 10% elongation, denoted Ms, greater than or equal to 30 MPa, preferably comprised between 40 and 120 MPa.

Each layer of coating rubber of the reinforcing polymer layer is preferably based on a diene rubber selected from the group consisting of polybutadienes, natural rubber, synthetic polyisoprenes, various copolymers of butadiene, various copolymers of isoprene, and mixtures of these elastomers.

The polymer of the said reinforcing polymer layer is advantageously multiaxially stretched.

The strips of the thermoplastic polymer layer may have a rectangular cross section and be positioned substantially parallel two by two, the said strips being positioned preferably between two layers of coating rubber. The strips may be assembled with one another using flexible fixing means that allow them to pivot relative to one another.

The reinforcing strips preferably have a width at least equal to five times their maximum thickness and more preferably at least equal to 20 times their maximum thickness. The reinforcing strips may have a tensile modulus greater than or equal to 500 MPa.

The thermoplastic polymer layer may form a film which, whatever the direction of tension considered in the plane of the film, has a Young's modulus E which is greater than 1000 MPa, preferably greater than 2000 MPa.

The circumferential filamentary reinforcing elements may, depending on choice, comprise steel, textile, carbon fibre, glass fibre, a thermoplastic polymer and combinations thereof.

The thermoplastic polymer is preferably the thermoplastic polymer PET.

The textile is preferably selected from polyester, aramid, nylon, rayon or combinations thereof.

The tire may comprise at least one electrically conducting rubber positioned between the belt reinforcer and the tread. This layer may also perform an additional role of preventing punctures.

BRIEF DESCRIPTION OF DRAWINGS

The invention will now be described with the aid of the examples and drawings that follow and in which.

In the various figures, technical elements that are identical or similar bear the same reference. In order not to overload the text, description thereof is not needlessly repeated.

DETAILED DESCRIPTION OF SPECIFIC EMBODIMENTS

Figure 1:
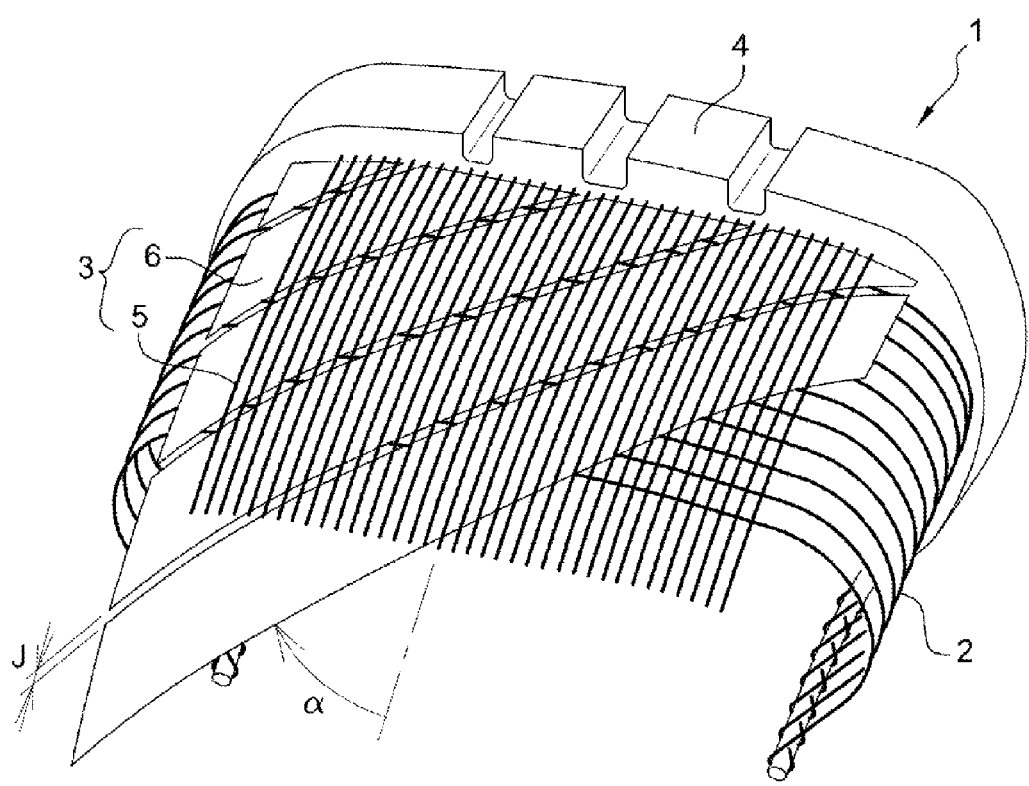
FIG. 1 is a schematic view showing the design of a tire according to the prior art.

As FIG. 1 (prior art) shows, the radial tire for a passenger vehicle, with general reference 1, according to the prior art, comprises a carcass reinforcement 2 radially on the inside of a belt reinforcer of general reference 3, the said belt reinforcer 3 being radially on the inside of a tread 4. In FIG. 1, the belt reinforcer 3 comprises a hooping ply 5 and a reinforcing ply 6. In FIG. 1, the hooping ply 5 is radially on the outside of the reinforcing ply 6.

The hooping ply 5 is usually made up of filamentary reinforcing elements, parallel two by two. These reinforcers are generally textile cables (for example made of nylon, rayon, polyester, aramid) or hybrid cables (for example made of aramid-nylon). In practice, because they are helically wound, the reinforcers of the hooping ply 5 are not strictly parallel to the circumferential direction, but make with this direction an angle at most equal to 7 degrees.

The reinforcing ply 6 is made up of a layer of polymer, preferably thermoplastic, for example polyethylene terephthalate (PET), itself positioned between two layers of coating rubber.

Figure 2:
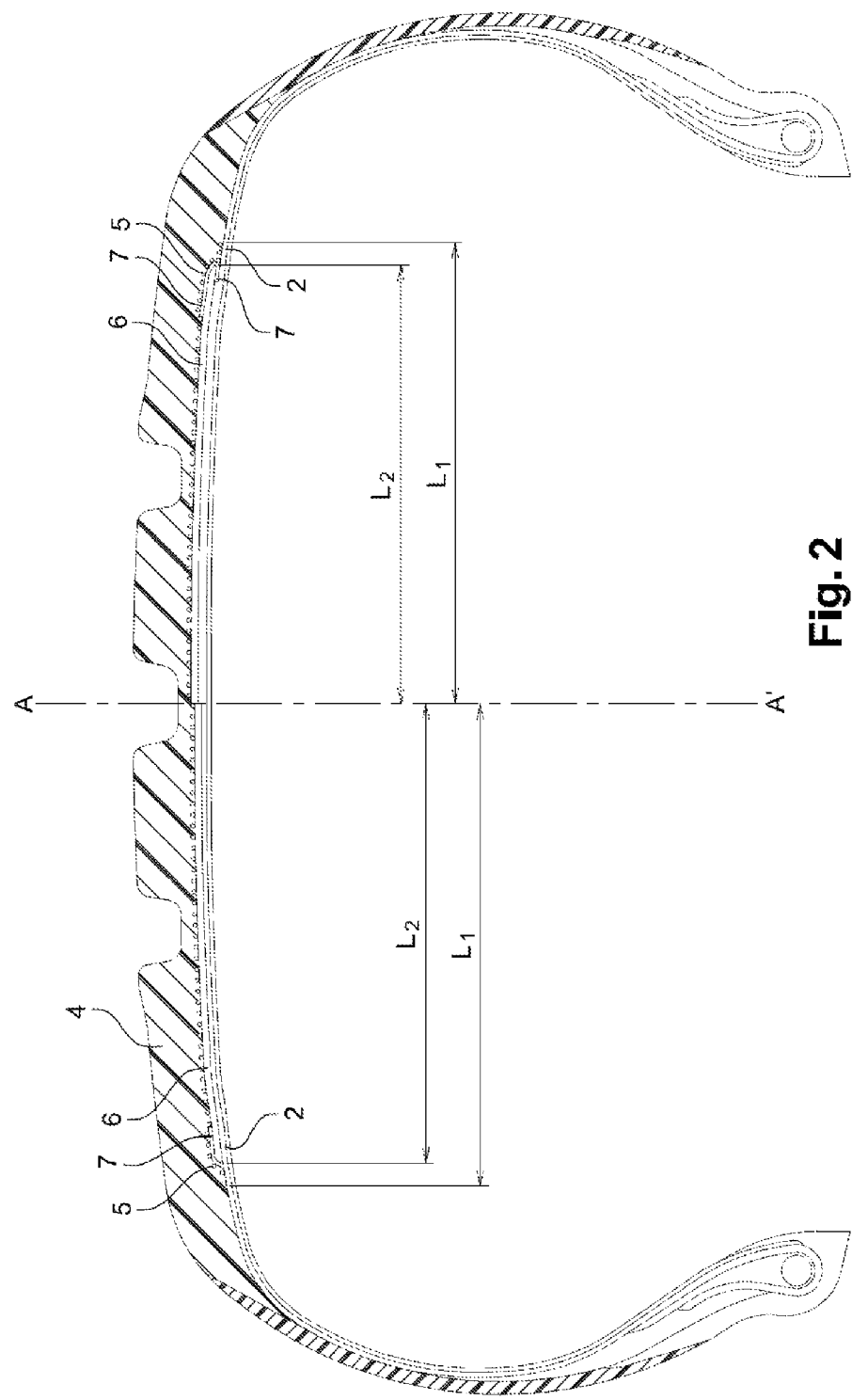
FIG. 2 is a schematic view showing a tire in section on the radial plane.

As FIG. 2 shows, the tire of the invention depicts two embodiments of the belt reinforcer according to the invention, one on each side of the axis AA'. According to these two embodiments, the belt reinforcer comprises a reinforcing ply 6 positioned radially towards the outside of the carcass reinforcement 2 and radially towards the inside of the hooping ply 5.

In both of these embodiments, a layer of edge uncoupling rubber 7 is positioned axially between the reinforcing ply 6 and the hooping ply 5. This layer of edge uncoupling rubber 7 has a secant modulus at 10% elongation of 16 MPa.

The hooping ply 5 has a half-width L1, and the reinforcing ply 6 a half-width L2. The half-width L1 is greater than the half-width L2. The difference (L1−L2) is approximately 6 mm.

Figure 3:
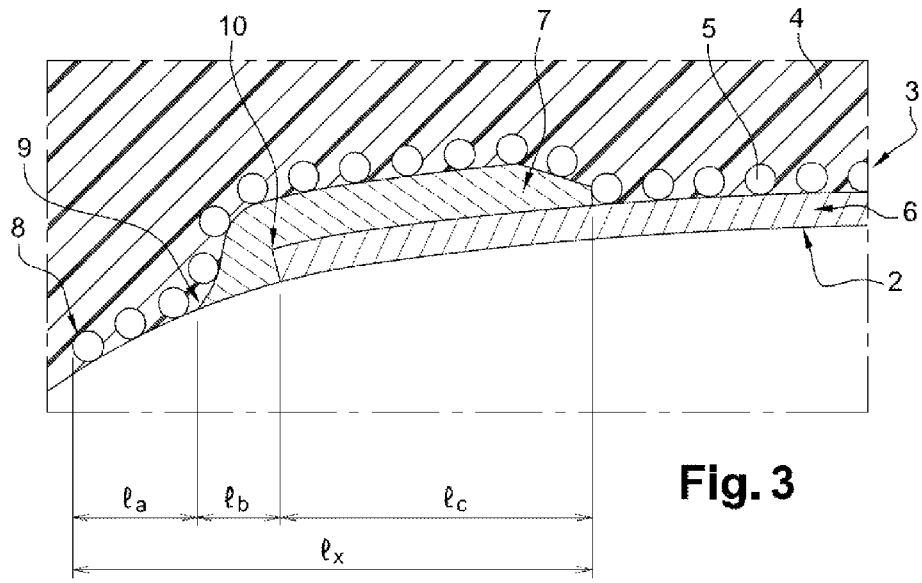
FIG. 3 is an enlarged schematic view of the transverse end situated to the left of the axis AA' and depicting the belt reinforcer of a tire according to a first embodiment.

As FIG. 3 shows in greater detail, the reinforcing ply layer 6 is positioned radially on the outside of the carcass reinforcement 2. The layer of edge uncoupling rubber 7 is positioned axially between the reinforcing ply 6 and the hooping ply 5. This layer of edge uncoupling rubber 7 has a secant modulus at 10% elongation of 16 MPa. The total length ($l_b + l_c$) of this rubber 7 in the transverse direction is approximately 15 mm, and its thickness (namely its dimension in a substantially radial direction), which is substantially uniform along its length, is approximately 0.4 mm.

The length $l_x$ comprises the edge uncoupling rubber 7 and part of the hooping ply 5. It is sub-divided into three sub-lengths $l_a$, $l_b$ and $l_c$. The sub-length $l_a$ is situated between the outside transverse end 8 of the hooping ply 5 and the outside transverse end 9 of the edge uncoupling rubber 7. The sub-length $l_b$ is situated between the outside end 9 of the edge uncoupling rubber 7 and the outside end 10 of the reinforcing ply 6. Finally, the sub-length $l_c$ is situated between the outside end 10 of the reinforcing ply 6 and the inside end 11 of the edge uncoupling rubber 7.

The sub-length $l_a$ is comprised between approximately 2 and 5 mm, the sub-length $l_b$ is comprised between 5 and 10 mm, and the sub-length $l_c$ is comprised between 5 and 15 mm, and is 10 mm.

The sub-lengths $l_a$, $l_b$ and $l_c$ may be the same or different.

According to various alternative forms of embodiment of this first embodiment, the belt reinforcer 3 comprises at least one reinforcing ply 6 and a single hooping ply 5. Each of these plies may be positioned radially in alternation, and in any possible combinations or arrangement provided that the hooping ply 5 is always radially on the outside of the reinforcing ply 6.

In the embodiment comprising one hooping ply 5 and several reinforcing plies 6, a layer 7 of edge uncoupling rubber may be positioned between each ply 5, 6 or just some of the reinforcing plies 6. This edge uncoupling rubber 7 may also have overall lengths that differ according to its location between the reinforcing plies 6 and the hooping ply 5.

Figure 4:
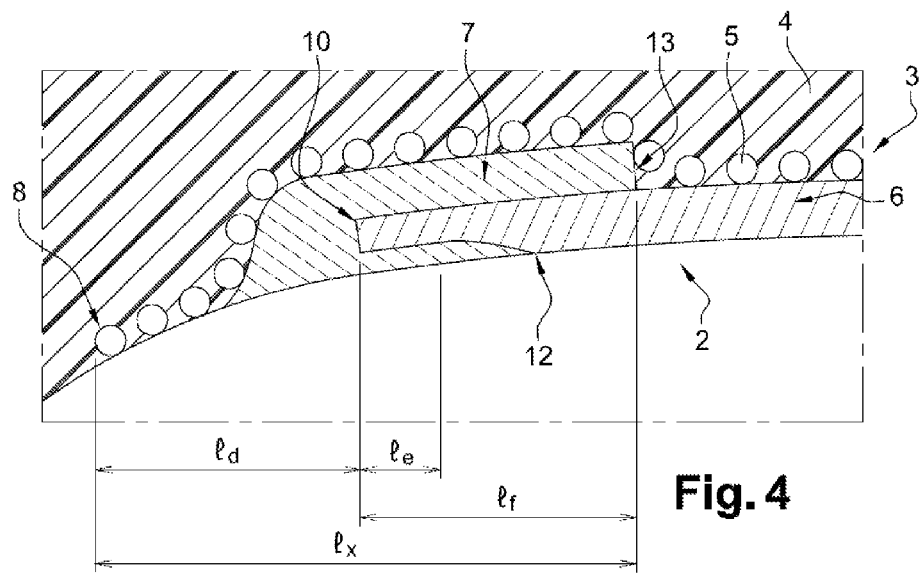
FIG. 4 is a schematic view of the transverse end situated to the right of the axis AA' and depicting the belt reinforcer of a tire according to a second embodiment.

FIG. 4 differs from FIG. 3 in that the edge uncoupling rubber 7 is positioned both underneath and on top of the reinforcing ply 6 so as to surround it, thereby forming a turn-up around this ply 6.

When the turn-up is present at just one axial end of the belt reinforcer 3, it is preferably present on that end that will face towards the outside of the vehicle once the tire has been mounted on the rim.

This turn-up may be present at just one transverse end or at both transverse ends of the belt reinforcer 3.

For preference, the edge uncoupling rubber coats the reinforcing ply 6.

According to the embodiment of FIG. 4, the edge uncoupling rubber 7 has an overall length lx. This overall length is broken down into three sub-lengths $l_d$, $l_e$ and $l_f$.

The sub-length $l_d$ is situated between the outside transverse end 8 of the hooping ply 5 and the outside end 10 of the reinforcing ply 6.

The sub-length $l_e$ is situated between the outside end 10 of the reinforcing ply 6 and the end 12 of the radially internal part of the edge uncoupling rubber 7.

The sub-length $l_f$ is situated between the outside end 10 of the reinforcing ply 6 and the end 13 of the radially external part of the edge uncoupling rubber 7. The sub-lengths $l_e$ and $l_f$ may be the same or different.

The sub-length $l_d$ is comprised between approximately 4 and 12 mm, the sub-length $l_e$ is comprised between approximately 5 and 20 mm and the sub-length $l_f$ is comprised between approximately 5 and 20 mm.

The turn-up of the edge uncoupling rubber 7 around the reinforcing ply 6 which is depicted in FIG. 4 is positioned in such a way that it encompasses the end 10 of the reinforcing ply 6.

1 the Polymer of the Reinforcing Ply

The polymer is preferably a thermoplastic polymer and constitutes the reinforcing ply 6, having been multiaxially stretched. It takes the form of strips of rectangular cross section. Multiaxially stretched films are well known for being used, essentially these days, in the packaging and foodstuffs industries, in the electrical field or even as a support for magnetic coatings.

The polymer used according to the invention is the one described in application WO2010/115860 A1, notably from page 8, paragraph 39 to page 12, paragraph 62 inclusive.

2 the Coating Rubber that Coats the Polymer Layer of the Reinforcing Ply

The coating rubber which coats each polymer layer of the reinforcing ply 6 may also coat the filamentary reinforcing elements of the hooping ply 5.

For preference, this coating rubber is a diene rubber. As is known, diene elastomers may be classified into two categories: those which are "essentially unsaturated" or those which are "essentially saturated". "Essentially unsaturated" means a diene elastomer derived at least in part from conjugated diene monomers with a proportion of blocks or units of diene origin (conjugated dienes) that is greater than 15% (mol %); thus diene elastomers such as butyl rubbers or copolymers of dienes and alpha-olefins of the EPDM type do not fall under the foregoing definition and may notably be qualified as "essentially saturated" diene elastomers (in which the proportion of blocks of diene origin is low or very low, always below 15%). Within the "essentially unsaturated" diene elastomer category, a "highly unsaturated" diene elastomer means in particular a diene elastomer having a proportion of blocks of diene origin (conjugated dienes) that is higher than 50%.

Although it applies to any type of diene elastomer, the present invention is preferably implemented using a diene elastomer of the highly unsaturated type.

This diene elastomer is more preferably selected from the group consisting of polybutadienes (BR), natural rubber (NR), synthetic polyisoprenes (IR), the various copolymers of butadiene, the various copolymers of isoprene, and mixtures of these elastomers, such copolymers notably being selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment is to use an "isoprene" elastomer, namely a homopolymer or a copolymer of isoprene, or in other words, a diene elastomer selected from the group consisting of natural rubber (NR), synthetic polyisoprenes (IR), the various copolymers of isoprene and mixtures of these elastomers. The isoprene elastomer is preferably natural rubber or a synthetic polyisoprene of cis-1,4 type. Of these synthetic polyisoprenes, use is preferably made of polyisoprenes having a proportion (mol %) of cis-1,4 bonds greater than 90%, more preferably still, greater than 98%. According to one preferred embodiment, each layer of rubber composition contains from 50 to 100 phr of natural rubber. According to other preferred embodiments, the diene elastomer may consist, in full or in part, of another diene elastomer such as, for example, an SBR elastomer which may or may not be used cut with another elastomer, for example of the BR type.

The rubber composition may contain just one or several diene elastomer(s), it being possible for the latter to be used in combination with any type of synthetic elastomer other than a diene elastomer, or even with polymers other than elastomers. The rubber composition may also contain all or some of the additives habitually used in the rubber matrices intended for the manufacture of tires, such as, for example, reinforcing fillers such as carbon black or silica, coupling agents, anti-ageing agents, antioxidants, plasticizers or oils of extension, plasticizing resins with a high Tg greater than 30° C., processability agents (making it easier to work), compositions in the raw state, tackifying resins, antireversion agents, acceptors and donors of methylene such as, for example, HMT (hexamethylenetetramine) or H3M (hexamethoxymethylmelamine), reinforcing resins (such as resorcinol or bismaleimide), known adhesion-promoting systems of the metal salt type for example, notably salts of cobalt, nickel or lanthanide, a crosslinking or vulcanizing system.

For preference, the system for crosslinking the rubber composition is a system referred to as a vulcanizing system, namely one based on sulphur (or on a sulphur donor) and on a primary vulcanization accelerator. Various known secondary accelerators or vulcanization activators such as stearic acid, zinc oxide, guanidine derivatives, retardants or antireversion agents may be added to this basic vulcanization system.

Any compound capable of acting as an accelerator of the vulcanization of the diene elastomers in the presence of sulphur may be used as a (primary or secondary) accelerator, notably accelerators of the thiazol type, and derivatives thereof, accelerators of the sulphenamide, thiuram, dithiocarbamate, dithiophosphate, thiourea and xanthate type. The following compounds may notably be cited as examples of such accelerators: 2-mercaptobenzothiazyl disulphide (MBTS for short), N-cyclohexyl-2-benzothiazyl sulphenamide (CBS), N,N-dicyclohexyl-2-benzothiazyl sulphenamide (DCBS), N-ter-butyl-2-benzothiazyl sulphenamide (TBBS), N-ter-butyl-2-benzothiazyl sulphenimide (TBSI), tetrabenzylthiuram disulphide (TBZTD), zinc dibenzyldithiocarbamate (ZBEC), 1-phenyl-2,4-dithiobiuret (DTB), zinc dibutylphosphorodithioate (ZBPD), zinc 2-ethylhexylphosphorodithioate (ZDT/S), bis O,O-di(2-ethylhexyl)thiophosphonyl disulphide (DAPD), dibutylthiourea (DBTU), zinc isopropyl xanthate (ZIX) and mixtures of these compounds.

Examples of vulcanization retarders include, for example, N-cyclohexylthiophthalimide (CTP for short) marketed under the tradename "Vulkalent G" by the company Lanxess, N-(trichloromethylthio)benzenesulphonamide marketed under the tradename "Vulkalent E/C" by Lanxess, or alternatively phthalic anhydride marketed under the tradename "Vulkalent B/C" by Lanxess.

All carbon blacks, notably blacks of type HAF, ISAF, SAF conventionally used in tires (referred to as tire grade blacks), are suitable as carbon blacks. Of these, carbon blacks of (ASTM) grade 300, 600 or 700 (for example N326, N330, N347, N375, N683, N772) will be mentioned more particularly. Precipitated or pyrogenated silicas having a BET surface area less than 450 $m^2/g$, preferably from 30 to 400 $m^2/g$, are notably suitable as silicas.

The person skilled in the art will, in the light of the present description, know how to adjust the formulation of the rubber composition in order to achieve the desired properties (notably modulus Ms levels) and will know how to adapt the formulation to suit the planned specific application.

It is well known to increase the stiffness of the rubber compositions by increasing, for example, their reinforcing filler content, the content of sulphur content and other vulcanization agents, or alternatively by introducing reinforcing resins, it being possible for all of these solutions to be combined in order to obtain higher rigidities.

Very high modulus rubber compositions that can be used in the context of the present invention and which hitherto have normally been reserved for regions of the tires that are more rigid than those of the belt, particularly for the beads of these tires, have, for example, been described in patent documents WO 2005/113259 (or U.S. Pat. No. 8,033,311) and WO 2005/113887 (or US 2008/0318077), together with detailed formulations thereof.

Sulphur is used at a preferred content comprised between 2 and 15 phr (parts by weight per hundred parts of rubber), and more preferably between 3 and 12 phr. The primary vulcanization accelerator, for example a sulphenamide, is used at a preferred content comprised between 0.5 and 10 phr. The vulcanization retardant, if present, is used at a preferred content comprised between 0.1 and 2 phr.

The content of reinforcing filler, for example carbon black and/or inorganic filler such as silica, is preferably higher than 50 phr, for example comprised between 60 and 140 phr; more preferably still it is higher than 70 phr, notably comprised between 70 and 120 phr.

In the case of the highest rigidities, the rubber composition may advantageously also contain an additional reinforcing resin consisting for example of a methylene acceptor, such as a formophenolic resin, at a preferred content comprised between 5 and 30 phr, more preferably between 10 and 25 phr, and a methylene donor such as HMT or H3M, at a preferred content comprised between 2 and 20 phr, more preferably between 5 and 15 phr.

According to another preferred embodiment, each layer of rubber composition comprises more than 5 phr, preferably between 5 and 30 phr, of a plasticizing agent, preferably in liquid form at ambient temperature (20° C.), intended to improve the processability (workability) of the rubber compositions in the raw state.

By way of example, any oil of extension, whether of aromatic or nonaromatic nature, any plasticizing agent known for its plasticizing properties towards diene elastomers can be used.

Liquid plasticizers selected from the group consisting of naphthenic oils (low or high viscosity, notably hydrogenated or otherwise), paraffin oils, MES (Medium Extracted Solvates) oils, DAE (Distillate Aromatic Extracts) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizers, ester plasticizers, phosphate plasticizers, sulphonate plasticizers and mixtures of these compounds are particularly suitable.

According to another preferred embodiment, each layer of rubber composition contains more than 3 phr, preferably between 3 and 15 phr, of a tackifying resin (remember, this is a resin able to provide some degree of "tack", namely immediate stickiness when pressed lightly against a support), intended to improve the stickiness in the raw state of the rubber compositions and the calendaring process during the manufacture of the multilayer laminate of the invention.

As is well known to those skilled in the art, the name "resin" is reserved for compounds which are, on the one hand, solid at ambient temperature (23° C.) (as opposed to a liquid plasticizing compound such as an oil) and, on the other hand, compatible (i.e. miscible at the content used) with the elastomer composition for which it is intended.

These tackifying resins are polymers well known to those skilled in the art; they may be aliphatic, aromatic, hydrogenated aromatic, of the aliphatic/aromatic type, namely based on aliphatic and/or aromatic monomers. They may be natural or synthetic and may or may not be based on petroleum (if they are, they are then also known as petroleum resins).

Examples of such tackifying resins notably include those selected from the group consisting of rosins and derivatives thereof, coumarone resins, phenolic resins, terpene resins (alpha-pinene, beta-pinene, or limonene), terpene-phenol resins, C5 cut and/or C9 cut resins, cyclopentadiene and/or dicyclopentadiene resins, alpha-methyl-styrene resins and mixtures of such resins.

According to one preferred embodiment of the invention, the tackifying resin used has at least any one, but more preferably all, of the following characteristics:

a Tg higher than 25° C., in particular comprised between 30° C. and 100° C. (measured by DSC in accordance with standard ASTM D3418);

a softening temperature above 50° C., preferably comprised between 50° C. and 150° C. (measured for example in accordance with standard ISO 4625 "Ring and Ball" method);

a number average molecular mass (Mn) comprised between 400 and 2000 g/mol, particularly between 500 and 1500 g/mol (measured for example by SEC (size exclusion chromatography) using polystyrene standards).

For preference, the modulus Ms of each rubber composition is higher than 40 MPa, notably comprised between 40 and 120 MPa; more preferably still, it is greater than 50 MPa, notably comprised between 50 and 100 MPa.

Measurements of the modulus MS are performed under tension, unless indicated otherwise, in accordance with standard ASTM D 412 of 1998 (test specimen "C") (of course, with a test specimen of rubber composition in the crosslinked, namely cured, vulcanized state as far as the preferred compositions of the crosslinkable type are concerned): the "true" secant modulus (namely the modulus with respect to the actual cross section of the test specimen) is measured in second elongation (namely after an accommodation cycle) at 10% elongation and is referred to here as Ms and expressed in MPa (under normal temperature and relative humidity conditions in accordance with standard ASTM D 1349 of 1999).

In the multilayer laminate of the invention, the thickness $e_2$ of each layer of rubber is preferably comprised between 0.05 and 2 mm, more preferably between 0.1 and 1 mm. For example, thicknesses of 0.2 to 0.8 mm have proven to be entirely suitable for reinforcing a tire casing.

For preference, notably when using the multilayer laminate as a protective structure or reinforcing structure for a tire belt, the multilayer laminate of the invention has a width and a length which are respectively greater than 2.5 mm and than 10 cm, more preferably respectively greater than 5 mm and than 20 cm.

The polymer film can be used as it is, namely as commercially available, or alternatively can be cut up into narrow strips or bands the width of which may vary to a large extent depending on the intended applications.

According to one preferred embodiment, in the multilayer laminate of the invention, the polymer film is provided with an adhesive layer facing each layer of rubber composition with which it is in contact. Of course, the invention also applies to instances in which no adhesive layer is used, the polymer film itself and/or each layer of rubber composition potentially having self-adhesive properties resulting from the way in which they are formulated.

In order to make the rubber adhere to the polymer film, it is possible to use any suitable adhesive system, for example a simple textile adhesive of the "RFL" (resorcinol-formaldehyde-latex) type comprising at least one diene elastomer such as natural rubber, or any equivalent adhesive known to confer satisfactory adhesion between rubber and conventional thermoplastic fibres such as fibres made of polyester, polyamide or aramid.

By way of example, the adhesive-coating method may essentially comprise the following successive steps: passage through a bath of adhesive, followed by draining (for example by blowing, calibrating) to eliminate the excess adhesive; then drying for example by passing through an oven (for example for 30 s at 180° C.) and finally heat treating (for example for 30 s at 220° C.).

Prior to the abovementioned adhesive-coating it may be advantageous to activate the surface of the film, for example mechanically and/or physically and/or chemically, in order to improve its keying of the adhesive and/or its final adhesion to the rubber. A mechanical treatment may for example involve a prior stack of peening or scratching the surface; a physical treatment may for example consist in a treatment using a radiation such as a beam of electrons; a chemical treatment may for example involve a prior passage through a bath of epoxy resin and/or isocyanate compound.

Because as a general rule the surface of the film of thermoplastic polymer is particularly smooth, it may also be advantageous to add a thickener to the adhesive used, in order to improve the overall keying of the adhesive to the film when it is being coated with adhesive.

A person skilled in the art will readily understand that, in the multilayer laminate of the invention, the connection between the polymer film and each layer of rubber with which it is in contact may be afforded definitively during the final curing (crosslinking) of the finished rubber item, notably the tire.

3 the Edge Uncoupling Rubber

The edge uncoupling rubber according to the invention is a typical composition of natural rubber, carbon black (55 phr), antioxidant, a vulcanization system based on zinc oxide and stearic acid, a vulcanization system based on sulphur (5 phr), and usual vulcanization additives (Ms modulus equal to 16 MPa).

The edge uncoupling rubber according to the invention may also correspond to the composition of the coating rubber.

Endurance Results

These results were obtained by numerical simulation using a finite-element calculation method on edge uncoupling rubbers with different modulus values.

This method is used to model a tire of size 205/55 R 16 according to the invention and corresponding to FIG. 3. The thickness of the edge uncoupling rubber is 0.6 mm, the width $l_b$ measures 5 mm and the width $l_c$ measures 15.2 mm.

A tire of the same size according to the prior art comprising two working crown plies making an angle equal to 25°, crossed with respect to one another, and a nylon hoop, is also modelled.

The width of the first, radially outer, working crown ply corresponds to the reinforcing ply 6 according to an embodiment of the invention. The width of the second, radially inner, working crown ply has a transverse width which, on each side, is 7 mm greater than the first working crown ply. This tire, according to the prior art, also comprises an edge uncoupling rubber positioned between the end of the second working crown ply and the hoop.

In the tire according to an embodiment of the invention and in the tire according to the prior art, the edge uncoupling rubber is modelled using the Mooney-Rivlin model.

According to this model, a tire inflated to 2.5 bar and subjected to a load of 4000 Newtons is compressed against a slippery surface.

To do that, a two-dimensional mesh structure of the meridian cross section of each tire is created and then this mesh structure is extruded around the axis of rotation of the tire in order to obtain a torus. The edge uncoupling rubbers are meshed with two elements in the thickness of 0.4 mm and with lengths of approximately 2 mm across the width lx. In the circumferential direction, an angular step of 0.5 degree was used in the region of contact with the ground, and of 1.25 degrees in the region opposite.

In this way, 283584 nodes were obtained for modelling the tire according to the invention and 304128 nodes for the comparison tire. The difference is explained by the fact that there are two working plies in the crown of the comparison tire.

The maximum level of shear is measured for each mesh of edge uncoupling rubber with 10% of uniaxial extension. Remember that maximum shear is defined as half the difference between the largest eigenvalue and the smallest eigenvalue of the tensor (Green-Lagrange strain).

In order to obtain values for the level of shear, the first step is to determine, on each ring, which mesh exhibits the maximum shear. The associated plane is then evaluated and then, at the turning of the wheel, the shear in this associated plane is evaluated. The ring is made up by taking an element from the two-dimensional mesh and all the elements extruded therefrom.

The calculated results, for various values of secant modulus at 10% elongation, are collated in Table I below.

TABLE I

| Secant modulus in elongation | Level of shear | |
|---|---|---|
| | Tire of the prior art | Tire according to the invention |
| 4 | 0.137 | 0.356 |
| 8 | 0.082 | 0.237 |
| 16 | | 0.144 |
| 40 | | 0.059 |
| 60 | | 0.035 |

The results make it possible to conclude that with an edge uncoupling rubber that has a low secant modulus at 10% elongation, the tire according to the invention has a level of shear of 2.6 (secant modulus of 4) and a level of shear of 2.9 (secant modulus of 8), which are levels that are higher than in the comparison tire.

Moreover, with an edge uncoupling rubber with a secant modulus in elongation that is four times higher, the tire according to the invention has the same level of shear as the comparison tire.

Therefore the use according to the invention of an edge uncoupling rubber with a high secant modulus in elongation makes it possible to maintain endurance qualities equivalent to those obtained with a tire according to the prior art. This is because the presence of an uncoupling rubber according to an embodiment of the invention makes it possible to reduce the mechanical work at the end of the reinforcing ply and therefore reduce local decohesions of the interfaces.

Rolling Resistance (RRt) Results

These results, which are collated in Table II, are obtained by mounting the tires on a 5J14 rim and inflating to 2.4 bar, then running them at 90 km/h.

Tire 1 is a tire according to the invention comprising a single reinforcing ply layer.

Tires 2 to 4 are tires according to the invention comprising two reinforcing plies.

TABLE II

| | Control | Tire 1 | Tire 2 | Tire 3 | Tire 4 |
|---|---|---|---|---|---|
| RRt in kg/t | 8.95 | 8.62 | 8.93 | 8.95 | 8.88 |

As Table II shows, the tires according to an embodiment of the invention exhibit better results than the control tire (lower RRt) or results that are just as good (same RRt).

Cornering Stiffness

These results, collated in Table III, are obtained by measuring the cornering force obtained for a tire subjected to 1° of side slip. The tires are mounted on a 5J14 rim and inflated to 2.4 bar, then run at 80 km/h and subjected to a load of 4950N.

Tires 1 to 5 are tires according to an embodiment of the invention comprising two reinforcing plies.

TABLE III

|  | Control | Tire 1 | Tire 2 | Tire 3 | Tire 4 | Tire 5 |
|---|---|---|---|---|---|---|
| D(z) in N/° | 1128 | 1126 | 1166 | 1215 | 1180 | 1230 |
| Difference in % | 0 | 0 | 3 | 8 | 5 | 9 |

As Table III shows, with the measurement spread being of the order of 3%, the tires according to the invention exhibit results (tire 1) just as good as the control tire, or even better (tires 2 to 5).

The invention claimed is:

1. A tire comprising at least one carcass reinforcement radially inside a belt reinforcer comprising a first and a second transverse end, the belt reinforcer being radially inside a tread, the belt reinforcer comprising the following distinct elements:
   a reinforcing ply, having a transverse half-width L2, comprising a polymer reinforcing layer positioned between two layers of coating rubber, the polymer layer being in the form of strips,
   at least one hooping ply, having a transverse half-width L1, and comprising filamentary reinforcing elements, parallel two by two, forming at most an angle at most equal to 7° with respect to the circumferential direction of the tire, the at least one hooping ply surmounting the reinforcing ply,
   wherein the tire comprises at least one layer of edge uncoupling rubber, positioned at least radially between the hooping ply and the reinforcing ply and positioned at at least one transverse end of the belt reinforcer, the layer of edge uncoupling rubber having a total length between 10 and 40 mm and a thickness between 0.2 and 1.2 mm, and comprising at least one reinforcing ply, wherein at at least one end of the belt reinforcer, the half-widths L1 and L2 are different, and manifest a difference (L1–L2) between 5 and 10 mm, and
   wherein each layer of coating rubber of the polymer reinforcing layer has a secant modulus at 10% elongation, denoted Ms, greater than or equal to 30 MPa.

2. The tire according to claim 1, wherein the edge uncoupling rubber has a secant modulus at 10% elongation between 3 and 70 MPa.

3. The tire according to claim 1, wherein a layer of the edge uncoupling rubber is positioned at each of the transverse ends of the belt reinforcer.

4. The tire according to claim 1, A wherein the layer of edge uncoupling rubber is positioned radially, at at least a first transverse end of the belt reinforcer, both underneath and on top of the reinforcing ply so as to form a turn-up around the reinforcing ply.

5. The tire according to claim 4, wherein the layer of edge uncoupling rubber is positioned both underneath and on top of the reinforcing ply so as to form a turn-up of the reinforcing ply at the second transverse end of the belt reinforcer.

6. The tire according to claim 1, wherein each layer of coating rubber of the reinforcing ply is a diene rubber.

7. The tire according to claim 1, wherein each layer of coating rubber of the polymer reinforcing layer is made of thermoplastic polymer.

8. The tire according to claim 1, wherein each layer of coating rubber of the polymer reinforcing layer comprises at least one liquid plasticizer.

9. The tire according to claim 1, wherein each layer of coating rubber of the polymer reinforcing layer comprises at least one tackifying resin.

10. The tire according to claim 1, wherein each layer of coating rubber of the polymer reinforcing layer is based on a diene rubber selected from the group consisting of polybutadienes, natural rubber, synthetic polyisoprenes, various copolymers of butadiene, various copolymers of isoprene, and mixtures of these elastomers.

11. The tire according to claim 1, wherein the polymer of the reinforcing polymer layer is multiaxially stretched.

12. The tire according to claim 1, wherein the reinforcing strips have a width at least equal to five times their maximum thickness.

13. The tire according to claim 1, wherein the reinforcing strips have a tensile modulus greater than or equal to 500 MPa.

14. The tire according to claim 1, wherein the polymer layer forms a film which, whatever the direction of tension considered in the plane of the film, has a Young's modulus E which is greater than 1000 MPa.

15. The tire according to claim 1, wherein the polymer is the thermoplastic polymer PET.

16. The tire according to claim 1, wherein the filamentary reinforcing elements are based on a material selected from at least one element of the group consisting of steel, textile, carbon fibre, glass fibre, and thermoplastic polymer.

17. The tire according to claim 16, wherein the textile is selected from at least one element of the group consisting of polyester, aramid, nylon, and rayon.

18. The tire according to claim 1, wherein it further comprises at least one electrically conducting rubber positioned between the belt reinforcer and the tread.

* * * * *